April 22, 1941.   C. A. SIEVERT ET AL   2,239,629
BALL BEARING RETAINER
Filed June 22, 1938
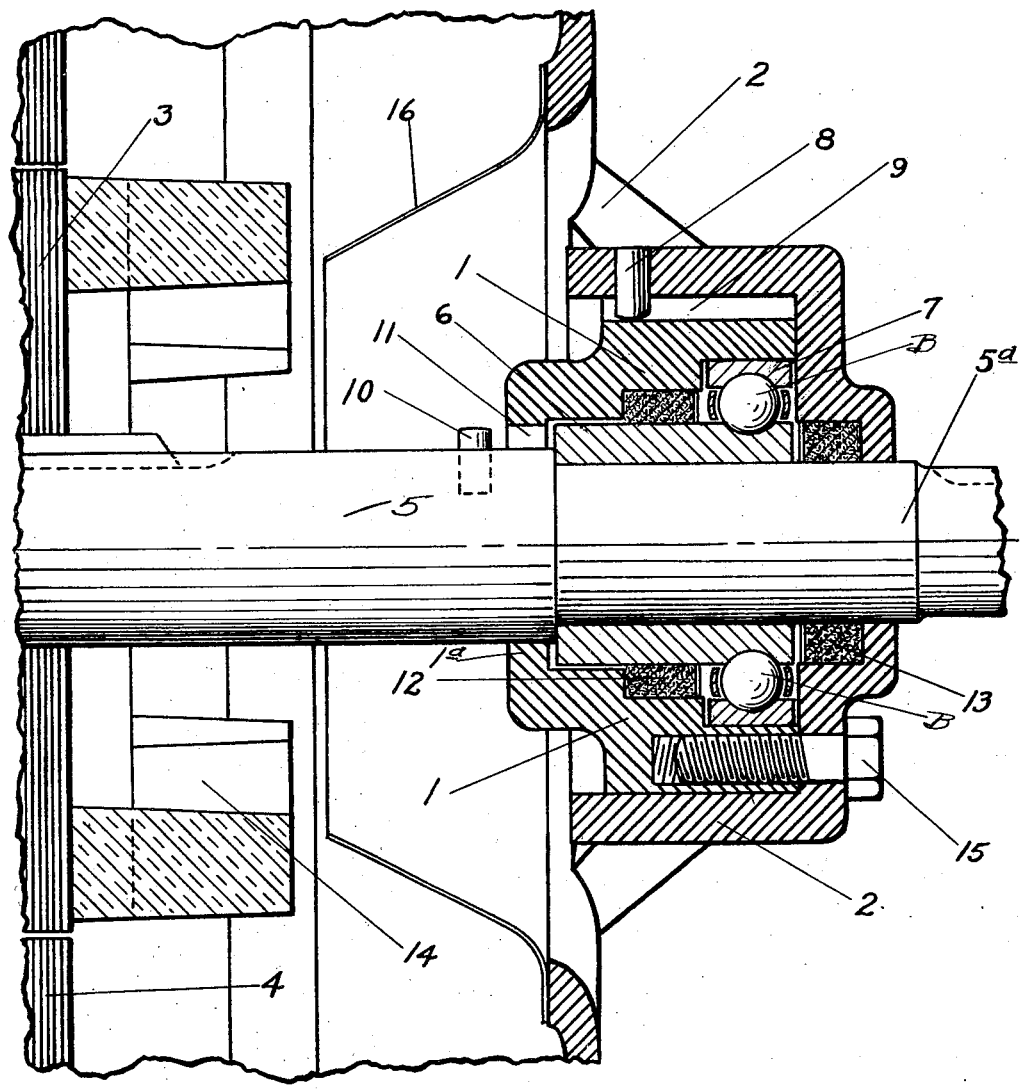
INVENTORS
Carl A. Sievert, Gerhard L. Freundt
and Luther H. Heinichen
WITNESS
J. Rex Allen, Jr.
Parkinson & Lane   ATTORNEYS.

Patented Apr. 22, 1941

2,239,629

UNITED STATES PATENT OFFICE 2,239,629

BALL BEARING RETAINER

Carl A. Sievert, River Forest, and Gerhard L. Freundt and Luther H. Heinichen, Chicago, Ill.; said Freundt and said Heinichen assignors to said Sievert Application June 22, 1938, Serial No. 215,080

3 Claims. (Cl. 308—189)

The present invention relates to a bearing assembly and particularly to a simplified form of ball bearing retainer assembly which may be easily and quickly mounted on a shaft or the like and which is so constructed that it may be disassembled and exposed for inspection and servicing in a very short time and by the removal of a minimum number of parts.

An object of the invention is to provide a ball bearing retainer assembly having a minimum number of parts. Another object is to provide a retainer which is so constructed that the parts may all be machined from one side with a single chucking.

Further objects are to provide a construction of maximum simplicity, efficiency, economy and ease of assembly and operation, and such further objects, advantages and capabilities as will later more fully appear and are inherently possessed thereby.

The invention further resides in the combination, construction and arrangements of parts illustrated in the accompanying drawing, and while we have shown therein a preferred embodiment, it is to be understood that the same is susceptible of modification and change, and comprehends other details, arrangements of parts, features and constructions without departing from the spirit of the invention.

Referring to the drawing, the figure shown is a view of the device in vertical cross section mounted on a shaft of a driving or driven machine.

Referring more particularly to the embodiment disclosed in the drawing, I represents the ball bearing retainer or inner, male housing section having inner flange or collar Iª at one end and open at the other end, said inner housing section being adapted to be received in outer, female housing section or casing 2, which is used in connection with rotating or driven member 3 in casing 4, the member 3 rotating with shaft 5. This shaft is provided or formed with a reduced portion or bearing surface 5ª upon which is pressed or secured a bushing or inner ring 6 of the ball bearing assembly. Adjacent the outer end of this bushing or ring is provided inner race for the ball bearings B. Suitably spaced from this inner ring 6 is outer ring 7 having internal race for the ball bearings. In the female housing member or retainer 2 is fixed locating pin or stud 8 which is adapted to be slidably received in key groove or slot 9 in the retainer or male housing I. This construction permits relative longitudinal movement of the parts I and 2 but prevents relative lateral movement or rotation thereof. Suitably fixed in the shaft 5 is pin, stud, or other suitable projection 10 which is adapted to be received in slot II in the collar Iª as later more fully set forth. Also surrounding the inner ring 6 and adjacent the ball bearings B is packing or lubricant retainer ring 12. Packing or lubricant retainer ring 13 is provided in the outer housing 2 around the shaft adjacent the inner ring 6. 14 represents a fan blade on the rotating part 3 and 15 represents a bolt, a plurality of which are provided to fit in complementary openings in the housing sections I and 2 and which are adapted to clamp these parts together and prevent longitudinal movement thereof. An air deflecting cone is shown at 16.

After the retainer section I has been slid onto the shaft 5 to the position shown in the drawing in which the collar Iª encircles the shaft, the bushing carrying the bearing assembly and packing or lubricant retainer ring 12 is pressed onto the reduced portion of the shaft 5ª. The housing 2 with the lubricant retainer or packing ring 13 positioned therein, is slid into position and bolted to the retainer section I, so that the open side of the inner housing I is covered by a wall of said outer section 2. When it is desired to disassemble the parts for inspection or servicing, the bolts 15, of which there are preferably three suitably spaced apart, are removed to permit the removal of the housing 2 after other bolts (not shown), which hold the housing 2 to the main structure, are removed. The shaft is then rotated until the slot II is opposite or aligned with pin 10 and the retainer is then slid back on the shaft thus exposing the ball bearing assembly to full view. When it is desired to replace the device in operative position, the retainer section or inner housing I is drawn or slid out until the collar Iª is free of the pin 10. The shaft is then slightly rotated until the pin 10 and slot II are out of alignment. In this position the pin 10 acts as a stop or abutment to prevent the retainer I from being pushed back on the shaft during further assembly operations. The housing piece 2 is then pushed or slid over the retainer, the pin 8 sliding in the slot 9 which is so positioned that when the pin is in the slot the openings in the housing sections I and 2 are aligned or opposite each other to receive the bolts 15 for securing the sections together. The outer housing member is secured in place on the casing 4 by means of bolts or the like (not shown).

It is thus apparent that we have provided a ball bearing retainer assembly which is an improvement over the prior constructions in that it consists of far fewer parts and may consequently be more readily assembled in position on the shaft as well as disassembled for inspection and servicing when desired than any construction used heretofore. It is also apparent that except for the bolt holes the parts 1 and 2 may be machined from one side on a single chucking.

Having thus disclosed the invention, we claim:

1. In a ball bearing assembly for a shaft, a bushing pressed on the shaft and providing an inner ball race at one end thereof, a ring spaced from the bushing and providing an outer ball race, balls in said races, a packing ring surrounding the bushing, an inner housing section loose on the shaft and surrounding the bearing and having a collar formed with a longitudinal slot, a projection on the shaft for limiting longitudinal movement of the housing section but permitting longitudinal movement when the slot and projection are brought into registry, an outer housing section carrying a packing ring therein, a pin on one housing section, a groove in the other housing section and means for locking said sections together, said last mentioned means including openings in said housing members which are in registry when the pin is in the groove.

2. A ball bearing assembly for a revolving shaft comprising an outer and an inner housing member, a groove in one member, a pin in the other and slidable in the groove permitting relative longitudinal movement of the members, a ball bearing having an inner and outer ring with balls therebetween, the inner ring being secured to the shaft, means for locking the housing members against relative longitudinal movement, said last mentioned means including openings in said housing members which are in registry when the pin is in the groove, said inner housing section having a longitudinal slot adjacent the shaft and a projection on the shaft for limiting longitudinal movement of the housing section when the slot and projection are out of registry but permitting longitudinal movement when the slot and projection are brought into registry.

3. A ball bearing assembly for a revolving shaft comprising an inner housing section open at one side, an outer housing section slidably engaging said inner section and telescoping therewith, said outer section having a wall so positioned as to close the open side of the inner section while said sections are in assembled relation, one of said sections having a longitudinal groove therein, a pin in the other housing section slidable in said groove so as to permit relative longitudinal movement of the sections, a ball bearing having an outer and an inner ring with balls therebetween, the inner ring being secured to the shaft, said housing sections being positioned on opposite sides of said ball bearing, and means for locking the housing members against relative longitudinal movement, said last mentioned means including openings in the housing sections, the positions of said openings being so related to the circumferential position of said groove that said openings will be in registry while the pin is within the groove.

CARL A. SIEVERT.
GERHARD L. FREUNDT.
LUTHER H. HEINICHEN.